United States Patent [19]

Cook et al.

[11] 4,016,531

[45] Apr. 5, 1977

[54] SYSTEM FOR RECORDING SEISMIC REFLECTION SIGNALS IN SERIAL-BY-TRACE FORMAT

[75] Inventors: Thomas W. Cook; Wayne A. Penner; Carl A. Quaglino; Charles D. Ray, all of Dallas; Lyndell F. Scott, Irving, all of Tex.

[73] Assignee: Mobil Oil Corporation, New York City, N.Y.

[22] Filed: Apr. 28, 1975

[21] Appl. No.: 572,471

[52] U.S. Cl. .................. 340/15.5 DP; 340/7 R; 340/15.5 GC; 340/172.5

[51] Int. Cl.² ..................................... G01V 1/24

[58] Field of Search .... 340/7 R, 15.5 DP, 15.5 GC, 340/174 BA, 174 LC, 172.5; 445/1; 235/173, 176

[56] References Cited

UNITED STATES PATENTS

| | | | |
|---|---|---|---|
| 3,134,957 | 5/1964 | Foote et al. | 340/15.5 DP |
| 3,356,996 | 12/1967 | Niquette et al. | 445/1 |
| 3,437,991 | 4/1969 | Porter | 340/7 R |
| 3,562,504 | 2/1971 | Harris | 340/15.5 GC |
| 3,573,740 | 4/1971 | Berger | 340/172.5 |
| 3,772,657 | 11/1973 | Marsalka et al. | 445/1 |
| 3,883,725 | 5/1975 | Fort et al. | 340/15.5 DP |

*Primary Examiner*—Nelson Moskowitz
*Attorney, Agent, or Firm*—C. A. Huggett; George W. Hager, Jr.

[57] ABSTRACT

A seismic exploration system employs a seismic energy source, a plurality of seismic energy detectors, and a seismic recording system. The recording system employs amplifiers, a multiplexer, and an analog-to-digital converter for converting analog seismic reflection signals resulting from repetitive firings of the seismic energy source to a serial output of multiplexed digital samples. These digital samples are sequentially strobed into selected storage locations in core memory, such storage locations being selected such that the multiplexed samples are reoriented serially by channel in successive ones of the storage locations. The digital samples are next sequentially strobed out of core memory by such successive storage locations to produce prior to each firing of the seismic source a serial-by-trace record of the detected seismic reflection signals resulting from the previous firing of the seismic source.

4 Claims, 6 Drawing Figures

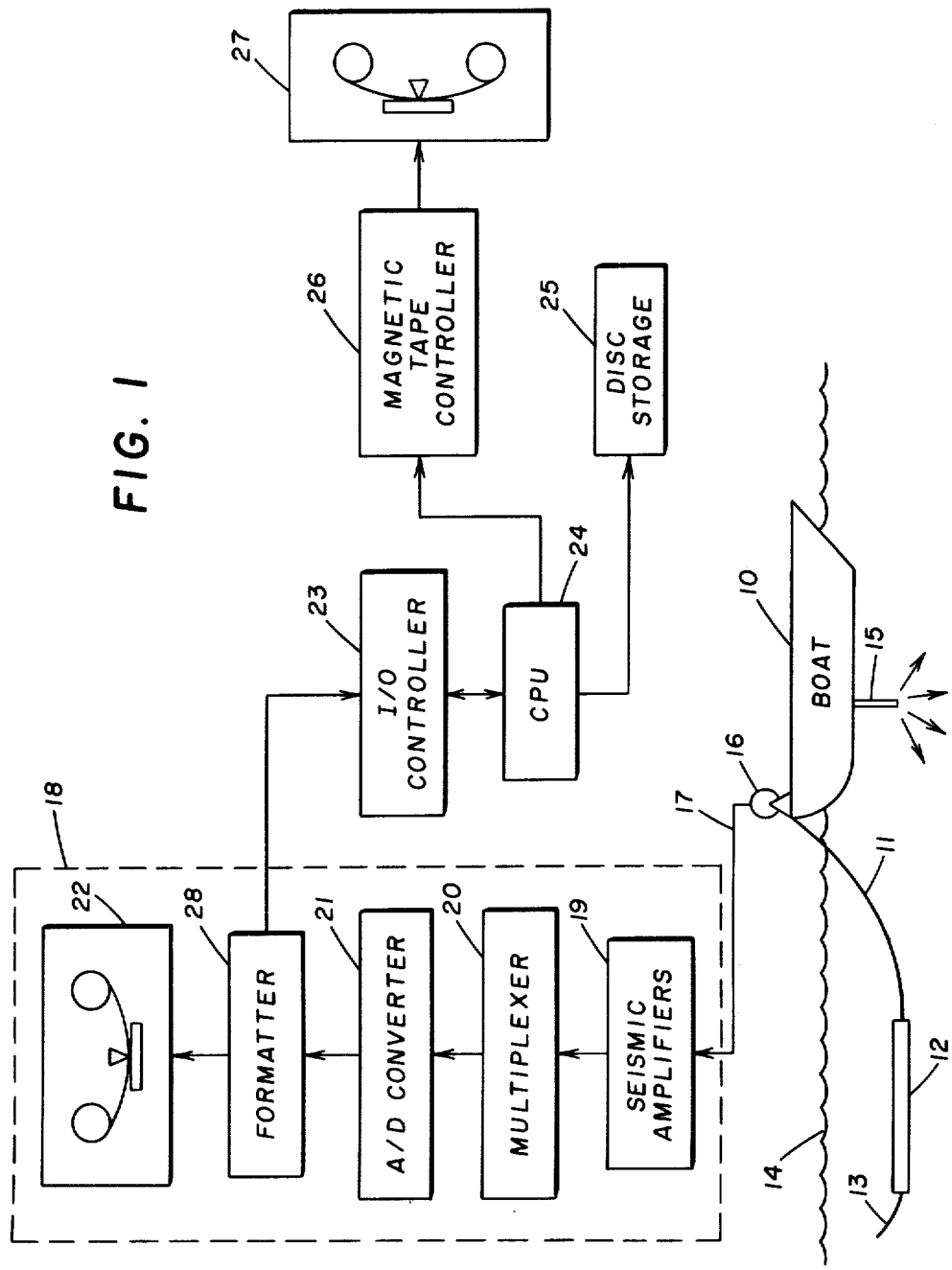

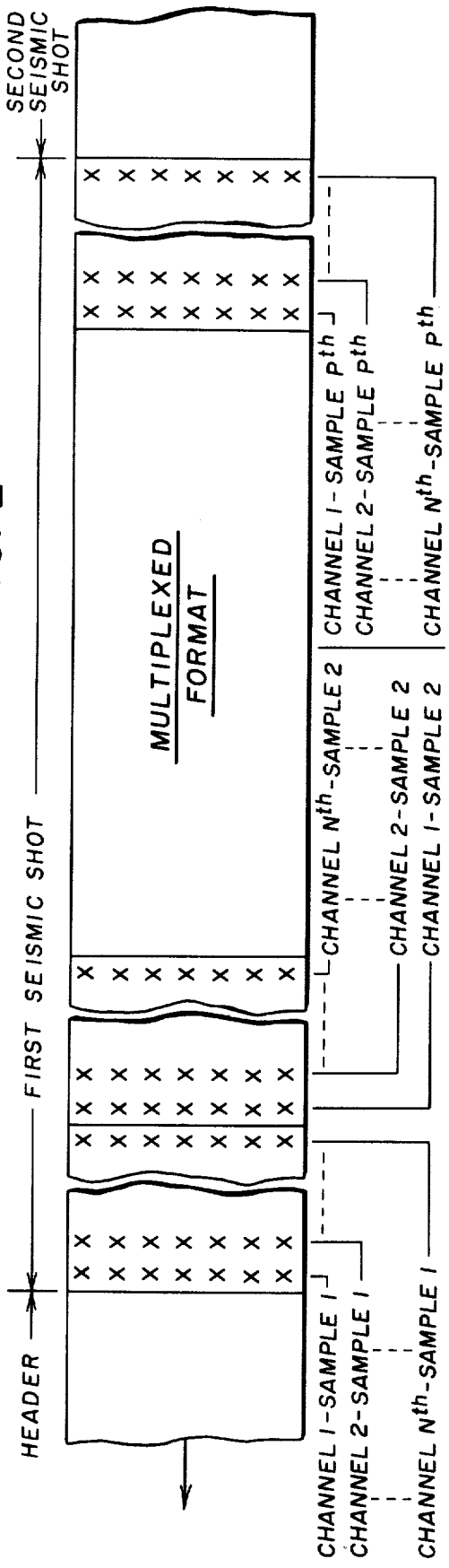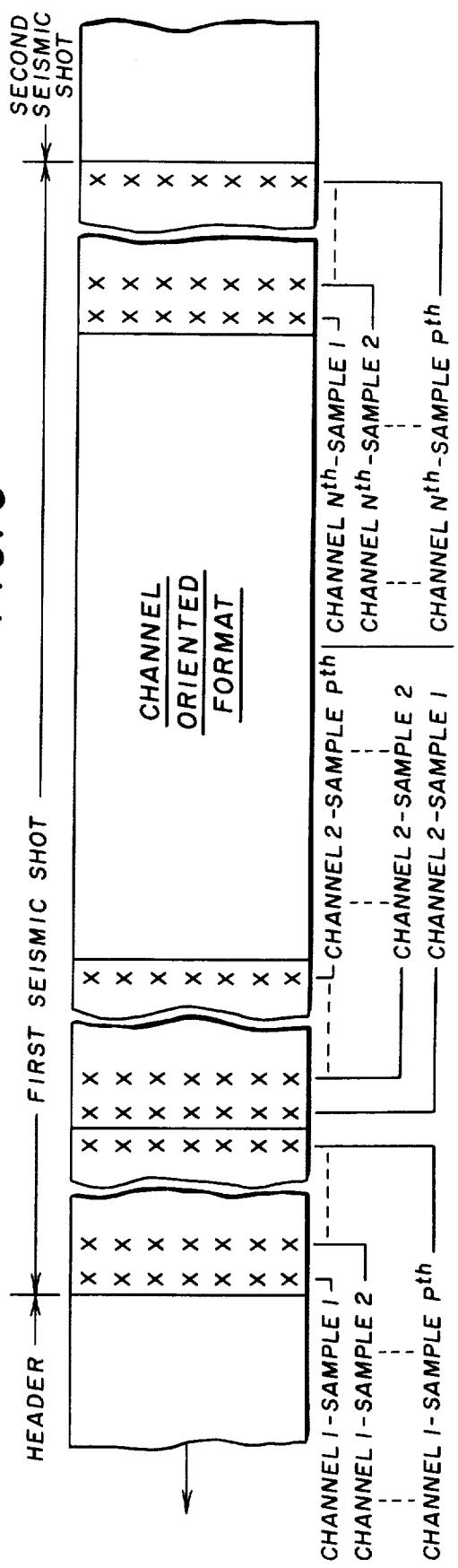

SYSTEM FOR RECORDING SEISMIC REFLECTION SIGNALS IN SERIAL-BY-TRACE FORMAT

BACKGROUND OF THE INVENTION

This invention relates to seismic exploration and more particularly to a system for simultaneously recording a plurality of seismic reflection signals in a plurality of recording channels and for producing a seismic record of such seismic reflection signals that is serially oriented by trace.

In seismic exploration, it has been found desirable to employ a plurality of seismic energy detectors to simultaneously record seismic analog reflection signals generated by the activation of one or more seismic energy sources. These seismic energy detectors are connected to a seismic recording system having a plurality of recording channels, the output of each detector being applied to one of the recording channels. It has become conventional practice in digital data recording techniques to sequentially and repeatedly sample through each of the recording channels to produce a serial output of multiplexed digital samples of the plurality of seismic analog reflection signals. These multiplexed digital samples are then conventionally recorded on magnetic tape in the multiplexed format as illustrated in FIG. 2.

SUMMARY OF THE INVENTION

The present invention is directed toward a seismic exploration system for recording a plurality of seismic reflection signals resulting from the generation of repetitive seismic pulses at predetermined time or distance intervals. More particularly, it is directed toward a method and system for recording of such seismic reflection signals in a plurality of channels, multiplexing samples of the seismic reflection signals from such recording channels, and reorienting such multiplexed samples for the production during each of said time or distance intervals of a seismic record that is serially oriented by trace of the seismic reflection signals recorded during the time or distance intervals.

In this aspect, the outputs of the seismic recording channels are sequentially and repeatedly sampled during each time or distance interval to produce a serial output of multiplexed samples of the plurality of seismic reflection signals. These serially oriented samples are placed into a core memory such that they are reoriented serially by channel in successive address locations of the core memory. This is accomplished by the sequential strobing of the first sample for each of the plurality of channels into storage locations that are separated a predetermined number of successive address positions from each other and thereafter strobing each additional sample for each of said plurality of channels into storage locations that are located successively one address position displaced from the storage location of the previous sample for each of the channels.

In a further aspect, there is provided a cyclical storage device having a plurality of data storage sectors located around the periphery of a rotatable disc and corresponding in number to said plurality of recording channels. Magnetic recording heads are fixed adjacent the disc, and the data storage sectors are cyclically advanced past these heads during revolution of the disc. The samples stored in successive address positions of the core memory are sequentially transferred to these magnetic recording heads at a rate such that during each disc revolution there are recorded on successive sectors samples from successive ones of the channels respectively.

Following the reorienting and recording of all the multiplexed samples taken from the plurality of seismic recording channels during each time interval, there is produced a seismic record that is serially oriented by trace of the seismic reflection signals detected during the time interval.

BRIEF DESCRIPTION OF THE DRAWINGS

FIG. 1 depicts a seismic marine exploration system embodying the present invention.

FIGS. 2, 3, and 5 illustrate particular data recording formats for the seismic reflection signals utilized in the seismic marine exploration system of FIG. 1.

DESCRIPTION OF THE PREFERRED EMBODIMENT

Figure 4:
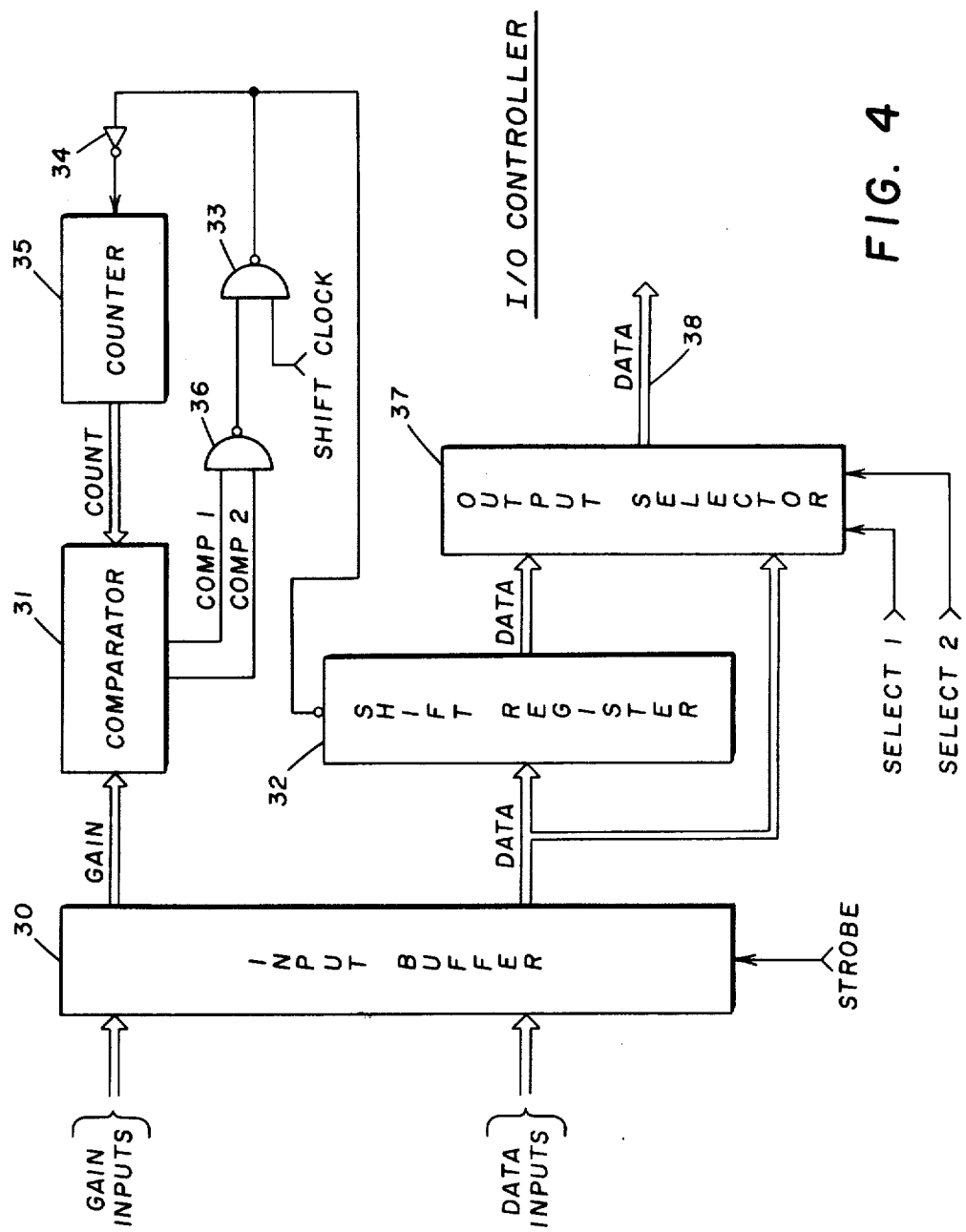
FIG. 4 illustrates in block diagram form the I/O controller portion of the seismic marine exploration system of FIG. 1.

Illustrated in FIG. 1 is a seismic exploration system employed in carrying out the present invention. A marine vessel 10 traverses a seismic exploration path in surveying the subsurface formation below the water layer. Streaming behind the vessel 10 by means of a cable 11 is a hydrophone streamer 12 employing a plurality of conventional acoustic detectors. Streamer 12 is further connected by a cable 13 to a surface support buoy 14. The acoustic detectors employed in the streamer 12 generate electrical signals in response to the reception of acoustic reflections from the subsurface formations caused by the generation of acoustic pressure waves from a seismic energy source 15 suspended from the vessel 10. Source 15 may employ any suitable type of marine acoustic energy generators such as, for example, the type disclosed in U.S. Pat. No. 3,506,085 to George B. Loper wherein an electrical signal operates an electromagnetic valve to allow high-pressure air to be suddenly released from a chamber within the gun, thereby providing an acoustic impulse into the water for the generation of an acoustic pressure wave.

Seismic reflection signals from the detectors of the streamer 12 are connected by way of the cable 11 to a reel 16 mounted on the vessel 10. From the reel 16, these seismic signals are connected by way of cable 17 to a seismic field recording system 18. The recording of the seismic signals is conventionally carried out by means of seismic amplifiers 19, multiplexer 20, analog-digital converter 21, formatter 28, and magnetic tape transport 22. One such conventional field recording system is the Texas Instruments Model DFS IV Digital Field Recorder. The multiplexed format used by such a recorder for recording digital samples of the seismic signals along the magnetic tape recording of transport 22 is shown in FIG. 2.

In a typical marine seismic exploration operation, for example, the seismic energy source 15 is fired at a repetitive pulse rate in the order of a few seconds as the vessel 10 traverses a seismic exploration path. In a preferred embodiment, a particularly suitable time interval between successive firings is in the order of 12 seconds. It is a specific aspect of the present invention that seismic reflection signals resulting from each seismic pulse from source 15 and recorded in the multiplexed format of FIG. 2 by a conventional field recording system 18 be reoriented and recorded in real time in a serial-by-trace format during the time interval between each such seismic pulse and the next successive seismic pulse.

Referring now to FIG. 2, a single byte of digital bits (X's) is shown as being recorded across the magnetic tape for each digital sample. Following the generation of the first seismic pulse by the source 15, the multiplexer 20 rapidly switches sequentially from the first to the last of the seismic recording channels to obtain these samples (i.e., CHANNEL 1 — SAMPLE 1 through CHANNEL N — SAMPLE 1). The second set of samples (i.e., CHANNEL 1 — SAMPLE 2 through CHANNEL N — SAMPLE 2) is obtained from a second sequential switching of multiplexer 20 across the seismic recording channels. After the last of the set of samples (i.e., SAMPLE P) has been recorded for each seismic channel, a second seismic pulse is produced and the resulting seismic signals recorded in similar manner. Accordingly, it can be seen that the digital samples representing the received seismic reflection signals are conventionally recorded in a multiplexed format. Although a single byte of digital bits is shown in FIG. 2 for each sample, any number of bytes may conventionally be employed. Further, although seven (7) digital bits are shown in FIG. 2 for each sample, any number of bits may be conventionally employed as is necessary to record data and gain information. In addition, a block bit, a clock bit, a parity bit, and a sign bit may also be recorded.

In accordance with the present invention, digital samples of the seismic signals recorded conventionally in the multiplexed format of FIG. 2 by means of a field recording system are reoriented into the serial-by-channel format of FIG. 3. Referring now to FIG. 3, the digital bits (X's) representing all of the samples for the first channel (i.e., CHANNEL 1 — SAMPLE 1 through CHANNEL 1 — SAMPLE P) are sequentially recorded along the magnetic tape. Each of the CHANNELS 2 through N is likewise sequentially recorded To carry out this reorienting of the multiplexed digital samples into the serial-by-channel format of FIG. 3, there are provided the input/output (I/O) controller 23, the central processor unit (CPU) 24, the disc storage units 25, the magnetic tape controller 26, and the magnetic tape transport 27 of FIG. 1.

In the preferred embodiment, the CPU 24 comprises a Texas Instruments Model 980 A Computer (32K memory) including the following peripheral control equipment: I/O expansion chassis, disc controllers, and block transfer controllers. Disc storage unit 25 may be one or more cyclical storage devices manufactured by Digital Development Corporation under Model 6200-128 (524K words). The magnetic tape controller 26 may be the National Computer Systems Controller Model UN-100, and the magnetic tape transport 27 may be comprised of at least one Ampex 9-track transport Model TMA-2.

The I/O controller 23 is illustrated in schematic form in FIG. 4 and will now be described in detail along with the operation of units 24–27 in carrying out the present invention.

Inputs to the I/O controller 23 are the multiplexed digital samples of the seismic reflection signals from the field recorder 18. The data bits representing the seismic reflection signals and the gain bits representing the amplification applied to these seismic reflection signals by the field recorder 18 are applied to an input buffer 30. Input buffer 30 comprises a plurality of flip-flops, one for each data bit and one for each gain bit. These flip-flops may preferably be Texas Instruments SN74174 flip-flops. These flip-flops are set to the logic states of their corresponding data-bit or gain-bit inputs in response to a strobe signal from the CPU 24. The outputs of the gain-bit flip-flops are applied to a comparator 31, while the outputs of the data-bit flip-flops are loaded into a shift register 32. These data bits are then shifted down one position in the shift register 32 in response to each shift clock pulse generated by the CPU 24 and applied to the shift clock input of shift register 32 by way of the NAND gate 33. Each shift clock pulse is also applied by way of NAND gate 33 and inverter 34 to a counter 35. Counter 35 provides a count signal to the comparator 31, indicative of the cumulative count of shift clock pulses occurring after the data bits have been strobed into the shift register 32.

Comparator 31 compares this count signal to the binary number represented by the gain bits as stored in the input buffer 30. So long as the cumulative count of the shift clock pulses is less than the binary number represented by the gain bits, the comparator 31 provides a comparison 1 control signal through NAND gate 36 to NAND gate 33. During the presence of the comparison 1 control signal, NAND gate 33 continues to apply shift clock pulses to both shift register 32 and counter 35. This allows the data bits to be continually shifted down the shift register 32.

Upon the cumulative count of the shift clock pulses becoming equal to the binary number represented by the gain bits, the comparator 31 provides a comparison 2 control signal through the NAND gate 36 to NAND gate 33. This comparison 2 control signal prevents NAND gate 33 from applying any further shift clock pulses to the shift register 32 and the counter 35. At this point, the data bits have been shifted down the shift register 32 a number of bit positions equal to the number of units of amplificationthat have been applied to these data bits by the seismic field recorder 18. Consequently, the position of these data bits in the shift register 32 following the termination of shifting represents the original amplitudes of these data bits prior to their amplification by an amplifier in the seismic field recorder 18.

More particularly, if the amplification of the data bits in the seismic amplifiers of the field recording system were seven (7), for example, the number represented by the gain bits will be 111 in a quaternary system or 0111 in a binary gain system. The data bits are shifted down the shift register 32 by the shift clock pulses until the counter 35 has counted seven (7) shift clock pulses for the binary system or fourteen (14) shift clock pulses for the quaternary system. At this time, the output of the counter is 111, and the comparator 31 provides the comparison 2 control signal for terminating the application of any further shift clock pulses to the shift register.

In a preferred embodiment, shift register 32 comprises a plurality of Motorola MC4012P shift registers; comparator 31 is a Signetics DM8200 binary comparator; counter 35 is a Texas Instruments SN74193 counter; and NAND gates 33 and 36 are Texas Instruments SN7400 gates.

The data bits from input buffer 30 and the data bits from shift register 32 are both applied to an output selector 37. Output selector 37 functions as a switch to apply the data bits from input buffer 30 to output line 38 in response to a select 1 control signal from CPU 24 or to apply the data bits from shift register 32 to output line 38 in response to a select 2 control signal from CPU 24. In this manner, the operator has the option of selecting as the digital samples for further processing either (i) the seismic reflection signals that have been conventionally recorded by means of a field recorder 18 and now represented by the data bits from input buffer 30 or (ii) the seismic reflection signals as they were originally received at the field recording system 18 from the hydrophones 12 and now represented by the data bits from shift register 32. In a preferred embodiment, the output selector 37 is a plurality of Texas Instruments SN74LS253 dual 4-line/1-line data selector/multiplexers.

The reorienting of the multiplexed digital samples from output selector 37 is carried out by means of the CPU 24, the disc storage unit 25, the magnetic tape controller 26, and the tape transport 27. The multiplexed digital samples are sequentially applied to the CPU 24 in the format shown and described in connection with FIG. 2. The CPU 24 stores these digital samples in such a manner that successive samples for a given recording channel are gathered in successive core locations. For example, in a preferred embodiment in which two computer words identify each sample of data, 63 core locations are skipped for each sequential storage of digital samples during a single switching of the multiplexer 20 through each of the recording samples. More particularly, during the first switching of multiplexer 20, the first digital samples from each of the seismic channels are stored as follows:
CHANNEL 1 — SAMPLE 1 in core locations 0,1;
CHANNEL 2 — SAMPLE 1 in core locations 64,65;
CHANNEL 3 — SAMPLE 1 in core locations 128,129;
. . . and so forth. During the second switching of multiplexer 20, the second digital samples of data from each of the seismic channels are stored in similar manner:
CHANNEL 1 — SAMPLE 2 in core locations 2,3;
CHANNEL 2 — SAMPLE 2 in core locations 66,67;
CHANNEL 3 — SAMPLE 2 in core locations 130,131;
. . . and so forth. Accordingly, the first 32 digital samples from each channel are stored in successive core locations, the first 32 samples for CHANNEL 1 being stored in core locations 0 through 63; the first 32 samples for CHANNEL 2 being stored in core locations 64 through 127; . . . and so forth. In the preferred embodiment the CPU 24 includes the block transfer controller of FIG. 6 for controlling this storage of the digital samples in particular core locations.

Figure 6:
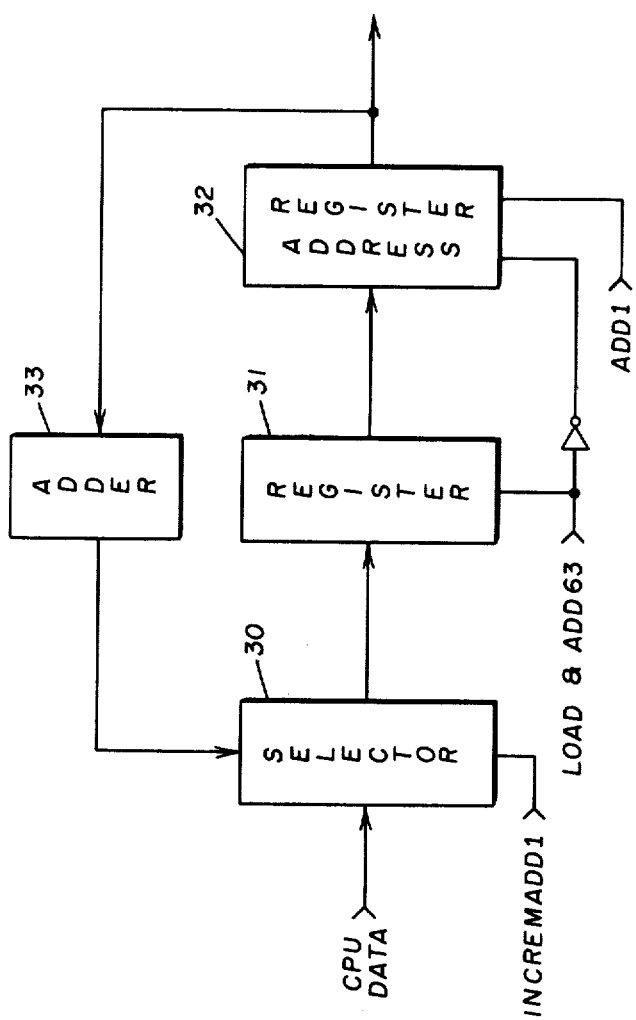
FIG. 6 illustrates in block diagram form a portion of the CPU unit of FIG. 1.

Referring now to FIG. 6, the initial address for the core location in which digital samples are to be stored is supplied by the CPU DATA signal to the selector 30. The control signal INCREMADD1 is provided to load this initial address from selector 30 into the register 31. The control signal LOAD + ADD63 permits the register 31 to load the address register 32 with the initial address.

After this initial addressing is complete, additional addressing is accomplished by either adding 1 or 63 to the address in the address register 32. For sequential storage locations in the memory, the ADD1 control signal is applied to the address register 32 to increment the address stored there by one position. For storage locations spaced 63 positions apart, as described in the example above, the INCREMADD1 control signal permits the selector 30 to apply the output of adder 33 to the register 31. Adder 33 functions to add 63 to the address in the address register 32. The LOAD and ADD63 control signal then loads the new address from register 31 into the address register 32.

In the preferred embodiment, selector 30 comprises a plurality of quadruple 2-line-to-1-line data selector/multiplexers manfactured by Texas Instruments under Part No. SN74157; comparator 31 comprises a plurality of hex D-type flip-flops manufactured by Texas Instruments under Part No. SN74174; address register 32 comprises a plurality of synchronous 4-bit up/down binary counters manufactured by Texas Instruments under Part No. SN74193; and adder 33 comprises a plurality of 4-bit binary full adders manufactured by Texas Instruments under Part No. SN7483A.

Figure 5:
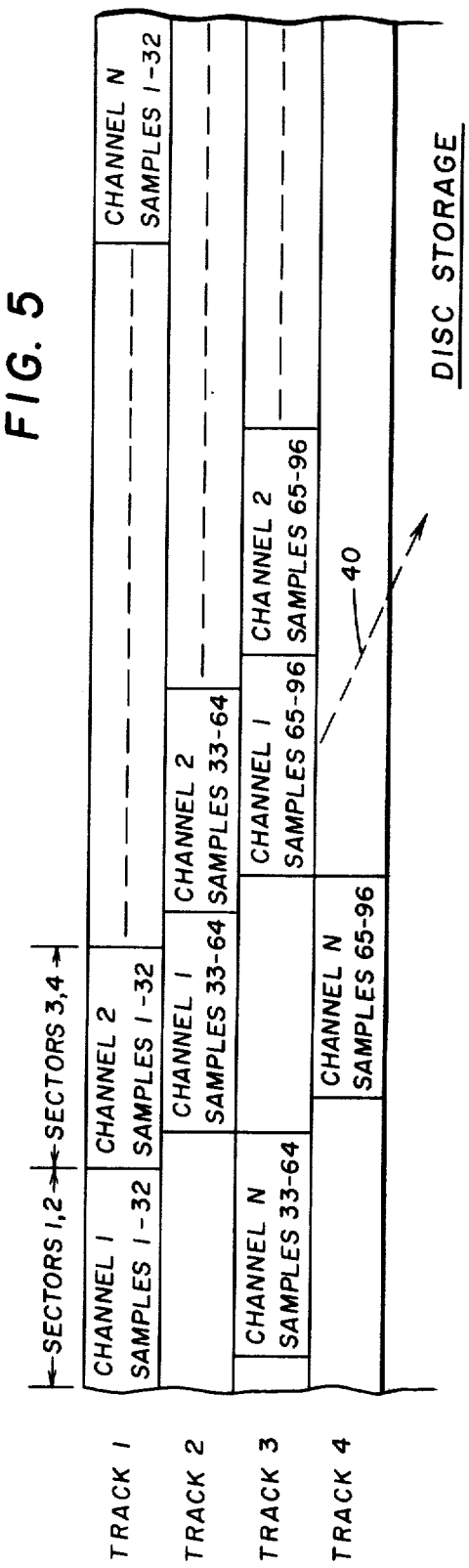

In seismic exploration, several thousand digital samples of the seismic reflection signals may be generated and recorded following the generation of each seismic pulse. In many instances, the core storage capacity of the CPU may be insufficient to gather all the digital samples for each channel into successive core locations; consequently, only a partial reorienting of the digital samples might be accomplished in the CPU. Upon the filling to capacity of the core storage of the CPU, the digital samples are transferred from core storage to disc storage. In the example of the preferred embodiment, digital samples are transferred out of sequential core locations in CPU 24 to a disc storage unit 25. Thereafter, in accordance with the example of the preferred embodiment, 32 more samples for each of the recording channels are stored in CPU 24 for subsequent transfer to disc storage unit 25. After the entire seismic recording for each channel has been completed, the disc storage unit 25 contains the entire seismic recording in the partially reoriented format as shown in FIG. 5. By next "scatter reading" the data from the disc storage unit 25 to the tape transport unit 27 under control of the CPU 24, the data is fully reoriented onto magnetic tape. More particularly, the magnetic read head on the disc storage unit 25 picks up the first set of 32 samples from CHANNEL 1 for transfer to magnetic tape unit 27 during a partial revolution of the disc. During succeeding disc revolutions, the magnetic read head sequentially picks up the successive sets of 32 samples from CHANNEL 1 along the diagonal line 40 in FIG. 5 until the entire recording of CHANNEL 1 has been recorded on magnetic tape. During subsequent disc revolutions, the data for CHANNELS 2 through N is similarly transferred to magnetic tape sequentially by sample as was CHANNEL 1. Consequently, the magnetic tape recording of the tape transport unit 27 is fully reoriented into the serial-by-channel format as shown in FIG. 3.

We claim:

1. In a method of seismic exploration wherein seismic reflection signals are recorded in a plurality of recording channels which are sequentially sampled to provide a serial output of multiplexed samples of the seismic reflection signals, the improvement comprising the steps of:

a. gathering a first set of said multiplexed samples into core memory such that the samples of said first set are reoriented serially by channel in successive address locations of said core memory, b. transferring said serially oriented samples sequentially from said successive address locations of said core memory onto a first storage section of a cyclical storage device, the serial samples for each channel being stored on a separate recording sector in said first section, c. repeating steps (a) and (b) for each of a plurality of sets of samples until all samples of the seismic reflection signals resulting from a single seismic pulse have been stored on recording sectors in a corresponding plurality of sections of said cyclical storage device, d. reading sequentially out of said cyclical storage device sections those sectors of stored samples comprising a first of said plurality of channels, e. repeating step (d) for each of said plurality of channels, and f. recording each sector of samples serially as it is read out of said cyclical storage device in steps (d) and (e) to produce a serially oriented by trace seismic record of the seismic reflection signals.

2. In a seismic exploration system having a source of seismic energy, a plurality of seismic detectors for receiving seismic reflection signals, and a recorder employing a plurality of channels connected to the plurality of detectors for sequentially sampling the received seismic signals in each channel and providing a serial output of multiplexed samples, the improvement comprising:

a. a memory storage unit having a plurality of addressable storage locations, b. means for sequentially strobing the first sample for each of said plurality of channels into storage locations that are separated a predetermined number of successive address positions from each other, c. means for strobing each additional sample for each of said plurality of channels into storage locations that are located successively one address position displaced from the storage location of the previous sample for each of said channels, and d. means for recording said stored samples sequentially by storage locations during the intervals between firings of said source of seismic energy to produce a seismic record that is serially oriented by trace of the detected seismic reflection signals.

3. The system of claim 2 wherein said means for recording said stored samples includes:

a. a cyclical storage device including a plurality of data storage sectors located around the periphery of a rotatable disc, and magnetic recording heads fixed adjacent said disc and past which said sectors are cyclically advanced during revolution of said disc, and b. means for sequentially transferring said samples out of successive address positions of said core memory to said magnetic recording heads at a rate such that during revolution of said disc there is recorded on each sector successive samples from the same channel.

4. The system of claim 3 further including:

a. a magnetic tape recording system, and b. means for successively transferring from said cyclical storage device to said magnetic tape recording system the samples from those sectors that comprise a single recording channel and repeating such transfer until all the samples for each of said channels have been successively transferred to said magnetic tape recording system, thereby producing a seismic record serially oriented by trace of the seismic reflection signals.

* * * * *